(12) United States Patent
Bhosale (10) Patent No.: US 11,231,211 B2
(45) Date of Patent: Jan. 25, 2022

(54) RETURN AIR RECYCLING SYSTEM FOR AN HVAC SYSTEM

(71) Applicant: Johnson Controls Technology Company, Auburn Hills, MI (US)

(72) Inventor: Anil V. Bhosale, District Satara (IN)

(73) Assignee: Johnson Controls Technology Company, Auburn Hills, MI (US)

(*) Notice: Subject to any disclaimer, the term of this patent is extended or adjusted under 35 U.S.C. 154(b) by 43 days.

(21) Appl. No.: 16/374,432

(22) Filed: Apr. 3, 2019

(65) Prior Publication Data

US 2020/0318873 A1 Oct. 8, 2020

Related U.S. Application Data

(60) Provisional application No. 62/828,306, filed on Apr. 2, 2019.

(51) Int. Cl.

| | |
|---|---|
| *F25B 40/04* | (2006.01) |
| *F25B 41/40* | (2021.01) |
| *F24F 12/00* | (2006.01) |
| *F25B 41/24* | (2021.01) |
| *F24F 1/42* | (2011.01) |

(52) U.S. Cl.
CPC ............... *F25B 40/04* (2013.01); *F24F 1/42* (2013.01); *F24F 12/003* (2013.01); *F25B 41/24* (2021.01); *F25B 41/40* (2021.01); *F25B 2339/041* (2013.01); *F25B 2400/0405* (2013.01); *F25B 2500/09* (2013.01); *F25B 2600/11* (2013.01); *F25B 2600/112* (2013.01); *F25B 2700/21171* (2013.01)

(58) Field of Classification Search
CPC .......................... F25B 40/04; F25B 2339/041; F25B 2600/11; F25B 2600/111; F25B 2600/112; F24F 1/48; F24F 12/003; F24F 11/76
See application file for complete search history.

(56) References Cited

U.S. PATENT DOCUMENTS

| | | | | |
|---|---|---|---|---|
| RE21,917 E | * | 10/1941 | Deverall | F25B 39/04 62/310 |
| 2,353,233 A | * | 7/1944 | Gygax | F28B 1/00 261/105 |
| 2,655,795 A | * | 10/1953 | Dyer | F25B 39/04 62/179 |

(Continued)

FOREIGN PATENT DOCUMENTS

| | | |
|---|---|---|
| EP | 1617153 A2 | 1/2006 |
| WO | 2017045934 A1 | 3/2017 |
| WO | 2017165924 A1 | 10/2017 |

*Primary Examiner* — Christopher R Zerphey
(74) *Attorney, Agent, or Firm* — Fletcher Yoder, P.C.

(57) ABSTRACT

A heating, ventilation, and/or air conditioning (HVAC) system having a return air recycling system that includes a heat exchanger configured to be disposed along a refrigerant circuit of the HVAC system and flow a refrigerant therethrough, an exhaust fan configured to direct return air across the heat exchanger to place the refrigerant in thermal communication with the return air and to exhaust the return air from the HVAC system, and a controller configured to adjust a speed of the exhaust fan, a flow rate of refrigerant through the heat exchanger, or both, based on feedback indicative of a temperature of the return air.

21 Claims, 8 Drawing Sheets

(56) References Cited

U.S. PATENT DOCUMENTS

| | | | | |
|---|---|---|---|---|
| 3,478,532 | A * | 11/1969 | Cootey | H02P 7/293 62/184 |
| 3,667,245 | A * | 6/1972 | Till | G05D 23/1906 62/180 |
| 3,817,451 | A * | 6/1974 | Ramsey | F25B 49/027 236/49.3 |
| 4,075,865 | A * | 2/1978 | Wills | F25B 49/027 62/183 |
| 4,887,438 | A * | 12/1989 | Meckler | F28D 15/02 62/271 |
| 4,890,666 | A * | 1/1990 | Clark | G05D 23/1917 165/208 |
| 4,938,032 | A * | 7/1990 | Mudford | F25B 13/00 62/160 |
| 4,938,035 | A * | 7/1990 | Dinh | F24F 6/02 62/279 |
| 5,325,676 | A * | 7/1994 | Meckler | F24F 1/00075 62/93 |
| 5,355,689 | A * | 10/1994 | Hara | B60H 1/00814 62/159 |
| 5,404,729 | A * | 4/1995 | Matsuoka | B60H 1/3207 62/179 |
| 5,411,078 | A * | 5/1995 | Ares | F24F 3/1405 165/113 |
| 5,419,149 | A * | 5/1995 | Hara | B60H 1/00007 62/160 |
| 5,509,272 | A * | 4/1996 | Hyde | F24F 3/153 62/176.5 |
| 6,247,326 | B1 * | 6/2001 | Likitcheva | F24F 13/222 62/279 |
| 6,694,769 | B2 * | 2/2004 | Pelleter | F24F 12/003 62/324.1 |
| 6,715,312 | B1 * | 4/2004 | Teakell | F25B 40/04 62/305 |
| 6,945,074 | B2 * | 9/2005 | Sato | F25B 6/00 62/500 |
| 8,316,654 | B2 | 11/2012 | Heinbokel et al. | |
| 8,381,541 | B2 * | 2/2013 | Yang | F24F 1/06 62/238.7 |
| 8,631,661 | B2 * | 1/2014 | Teige | F24F 3/1423 62/94 |
| 8,915,092 | B2 * | 12/2014 | Gerber | F24D 19/0095 62/94 |
| 9,651,321 | B2 * | 5/2017 | Zhou | F24F 11/76 |
| 10,036,580 | B2 * | 7/2018 | Zha | F25B 25/00 |
| 10,160,289 | B2 * | 12/2018 | Hamamoto | B60H 1/00921 |
| 10,161,662 | B2 * | 12/2018 | Goel | F25B 6/04 |
| 10,197,318 | B2 * | 2/2019 | Miyamoto | F25B 49/02 |
| 10,309,719 | B2 * | 6/2019 | Imamkhan | F25B 9/00 |
| 10,386,089 | B2 * | 8/2019 | Goel | F24F 1/0003 |
| 10,401,068 | B2 * | 9/2019 | Kopko | F25B 40/04 |
| 10,589,599 | B2 * | 3/2020 | Tsunoda | F25B 41/20 |
| 2005/0028545 | A1 * | 2/2005 | Hebert | F24F 12/006 62/274 |
| 2005/0028547 | A1 * | 2/2005 | Hatakeyama | F25B 41/20 62/324.1 |
| 2006/0179874 | A1 * | 8/2006 | Barger | F25B 6/04 62/506 |
| 2008/0104980 | A1 | 5/2008 | Payton | |
| 2009/0084127 | A1 * | 4/2009 | Nakata | F24F 1/0007 62/291 |
| 2010/0242507 | A1 * | 9/2010 | Meckler | F25B 40/00 62/94 |
| 2011/0192182 | A1 * | 8/2011 | Noda | B01D 53/265 62/160 |
| 2013/0061615 | A1 | 3/2013 | Omer | |
| 2015/0362230 | A1 | 12/2015 | Al-Farayedhi et al. | |
| 2019/0323722 | A1 * | 10/2019 | Goel | F24F 3/1405 |

\* cited by examiner

RETURN AIR RECYCLING SYSTEM FOR AN HVAC SYSTEM

CROSS REFERENCE TO RELATED APPLICATIONS

This application claims priority from and the benefit of U.S. Provisional Application Ser. No. 62/828,306, entitled "RETURN AIR RECYCLING SYSTEM FOR AN HVAC SYSTEM," filed Apr. 2, 2019, which is hereby incorporated by reference in its entirety for all purposes.

BACKGROUND

The present disclosure relates generally to a heating, ventilation, and/or air conditioning (HVAC) system, and more particularly, to a return air recycling system for an HVAC system.

HVAC systems are utilized in residential, commercial, and industrial environments to control environmental properties, such as temperature and humidity, for occupants of the respective environments. The HVAC system may control the environmental properties through control of an air flow delivered to the environment. In some cases, the HVAC system may receive return air, or exhaust air, from the respective environments and may discharge all or a portion of the return air toward an ambient environment external to the respective environments. The return air may include a temperature that is relatively low. Unfortunately, existing systems that discharge the return air to the ambient environment do not utilize the cooling capacity of the return air.

SUMMARY

In one embodiment of the present disclosure, a heating, ventilation, and/or air conditioning (HVAC) system has a return air recycling system that includes a heat exchanger configured to be disposed along a refrigerant circuit of the HVAC system and flow a refrigerant therethrough, an exhaust fan configured to direct return air across the heat exchanger to place the refrigerant in thermal communication with the return air and to exhaust the return air from the HVAC system, and a controller configured to adjust a speed of the exhaust fan, a flow rate of refrigerant through the heat exchanger, or both, based on feedback indicative of a temperature of the return air.

In another embodiment of the present disclosure, a heating, ventilation, and/or air conditioning (HVAC) system includes a first heat exchanger disposed along a refrigerant circuit and configured to receive a refrigerant to place the refrigerant in thermal communication with ambient air, a second heat exchanger disposed along the refrigerant circuit and configured to receive the refrigerant upstream of the first heat exchanger with respect to a flow direction of the refrigerant through the refrigerant circuit, an exhaust fan configured to direct return air across the second heat exchanger to place the refrigerant in thermal communication with the return air, and a controller configured to adjust a speed of the exhaust fan, a flow rate of refrigerant through the second heat exchanger, or both, based on feedback indicative of a temperature of the return air.

In a further embodiment of the present disclosure, a return air recycling system for a heating, ventilation, and air conditioning (HVAC) system includes a heat exchanger configured to receive refrigerant from a refrigerant circuit of the HVAC system, an exhaust fan configured to direct return air across the heat exchanger to place the refrigerant in thermal communication with the return air, a valve having an open position and a closed position, where the valve is configured to enable a flow of the refrigerant through the heat exchanger in the open position and to block the flow of refrigerant through the heat exchanger in the closed position, and a controller configured to adjust a speed of the exhaust fan, a position of the valve, or both, based on feedback indicative of an operating parameter of the HVAC system.

Other features and advantages of the present application will be apparent from the following, more detailed description of the embodiments, taken in conjunction with the accompanying drawings which illustrate, by way of example, the principles of the application.

DETAILED DESCRIPTION

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is directed to a return air recycling system that may increase operational efficiency of a heating, ventilation, and/or air conditioning (HVAC) system. As set forth above, existing HVAC systems may discharge return air, also referred to herein as exhaust air, from a conditioned environment to an ambient environment. As the return air is drawn from an environment conditioned by the HVAC system, the return air may have a relatively low temperature. It is now recognized that the relatively low temperature of the return air may be suitable for providing additional cooling to components of the HVAC system. As such, discharging the return air directly to the ambient environment may waste or otherwise not utilize an additional cooling capacity of the return air, thereby limiting operational efficiency of the HVAC system.

Accordingly, embodiments of the present disclosure are directed to a return air recycling system that utilizes return air to supplement cooling of a refrigerant circulated within a refrigerant circuit of the HVAC system in order to increase an efficiency of the HVAC system. In some embodiments, the return air recycling system includes an auxiliary heat exchanger, such as a de-superheating coil, that places refrigerant in thermal communication with return air drawn from an environment conditioned by the HVAC system. The auxiliary heat exchanger may be disposed along a refrigerant circuit of the HVAC system and may be positioned upstream of a condenser disposed along the refrigerant circuit of the HVAC system with respect to a flow of refrigerant through the refrigerant circuit.

An exhaust fan may also be included in the return air recycling system to force or draw the return air across the auxiliary heat exchanger under certain conditions. For example, a control system may be communicatively coupled to a temperature sensor configured to provide feedback indicative of a temperature of the return air received from a return air duct. The control system may adjust a speed of the exhaust fan based on the feedback received from the temperature sensor. Further, the return air recycling system may include a bypass valve that is configured to enable refrigerant to flow though the auxiliary heat exchanger and/or to bypass the auxiliary heat exchanger and flow directly toward the condenser. The bypass valve may also be communicatively coupled to the control system, and a position of the bypass valve may thus be controlled based on the feedback indicative of the temperature of the return air. In some embodiments, the return air may be directed across the auxiliary heat exchanger, but not across the condenser. In such embodiments, the condenser may place the refrigerant in thermal communication with ambient air received from the ambient environment. In other embodiments, the return air may be configured to flow across both the auxiliary heat exchanger and the condenser before the return air is discharged to the ambient environment as exhaust air. The return air directed across the condenser may be mixed with ambient air to supplement cooling of the refrigerant in the condenser.

In certain embodiments, the return air recycling system may also include an adiabatic cooling section that utilizes condensate generated within the HVAC system, such as at an evaporator section of the HVAC system, to cool the return air. For example, nozzles may be disposed downstream of the auxiliary heat exchanger with respect to a flow of the return air across the auxiliary heat exchanger. The nozzles may spray or otherwise direct condensate into the return air that has absorbed thermal energy from the refrigerant within the auxiliary heat exchanger to cool the return air before the return air flows across the condenser. As such, the return air may be utilized to absorb thermal energy from the refrigerant flowing through both the auxiliary heat exchanger and the condenser. In any case, the return air may be utilized to further cool refrigerant of the HVAC system to increase an efficiency of the HVAC system before the return air is discharged to the ambient environment as exhaust air.

Figure 1:
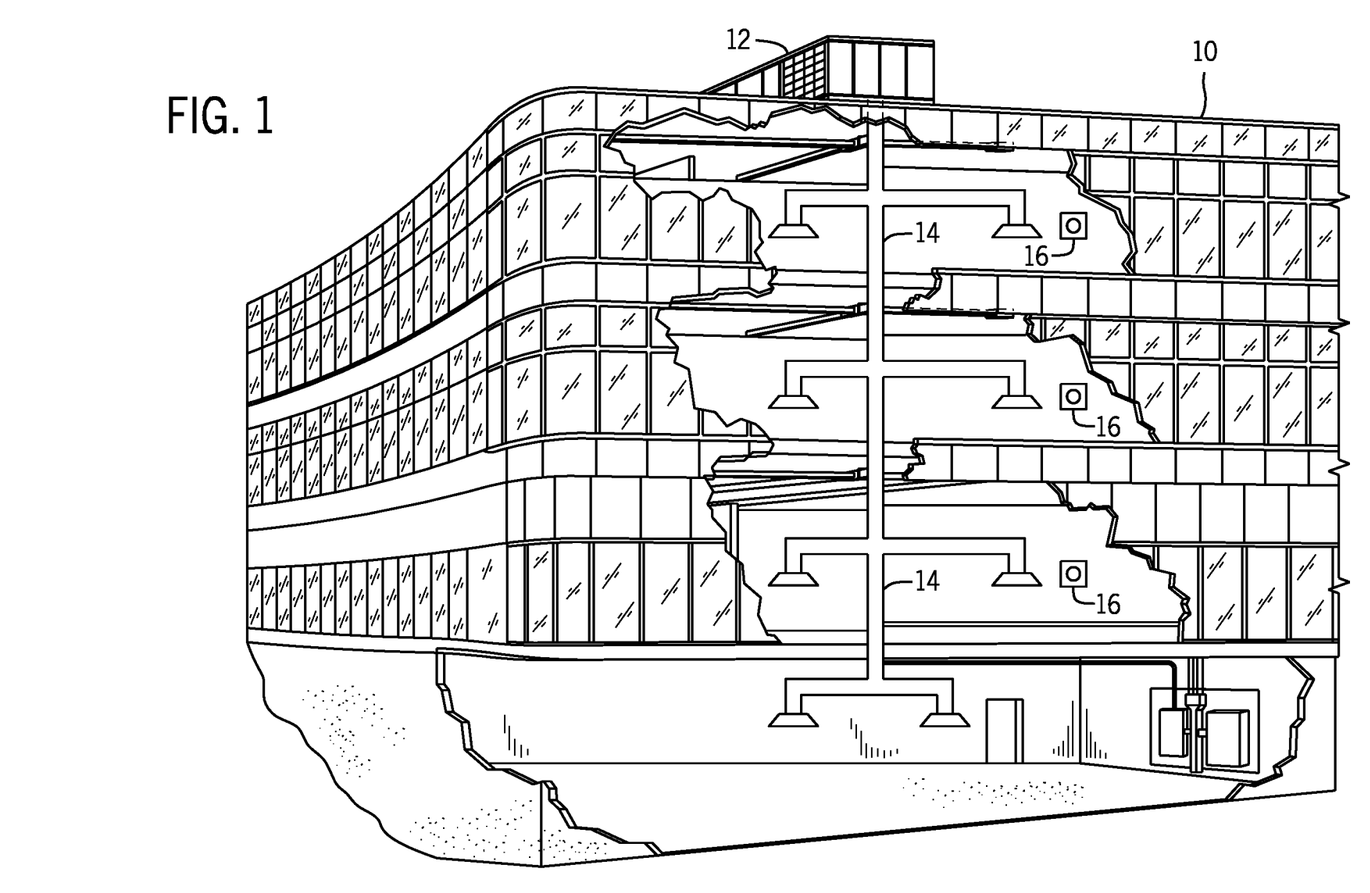
FIG. 1 is a schematic of an embodiment of an HVAC system for building environmental management that includes an HVAC unit, in accordance with an aspect of the present disclosure.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
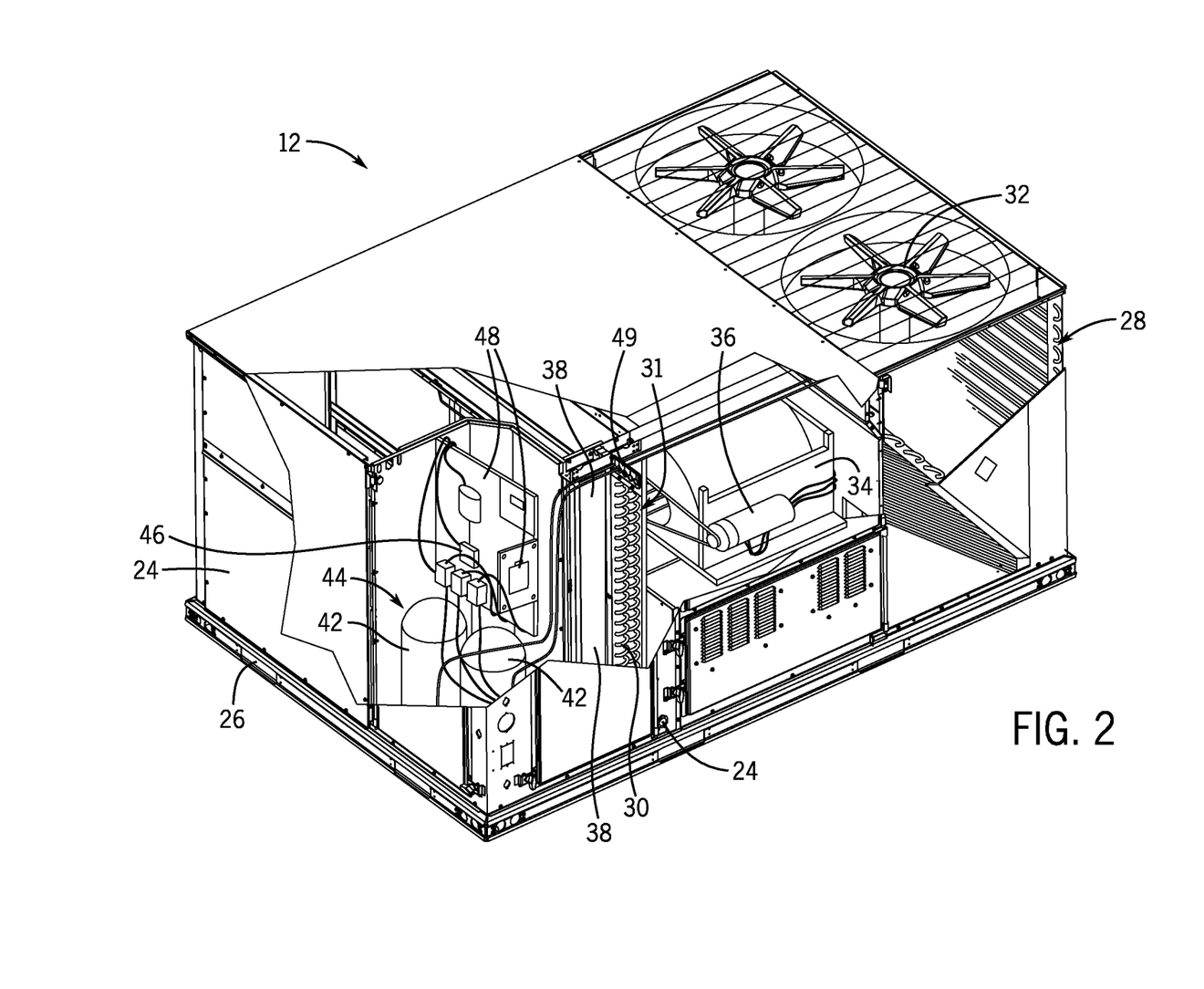
FIG. 2 is a perspective view of an embodiment of an HVAC unit that may be used in the HVAC system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multi-channel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
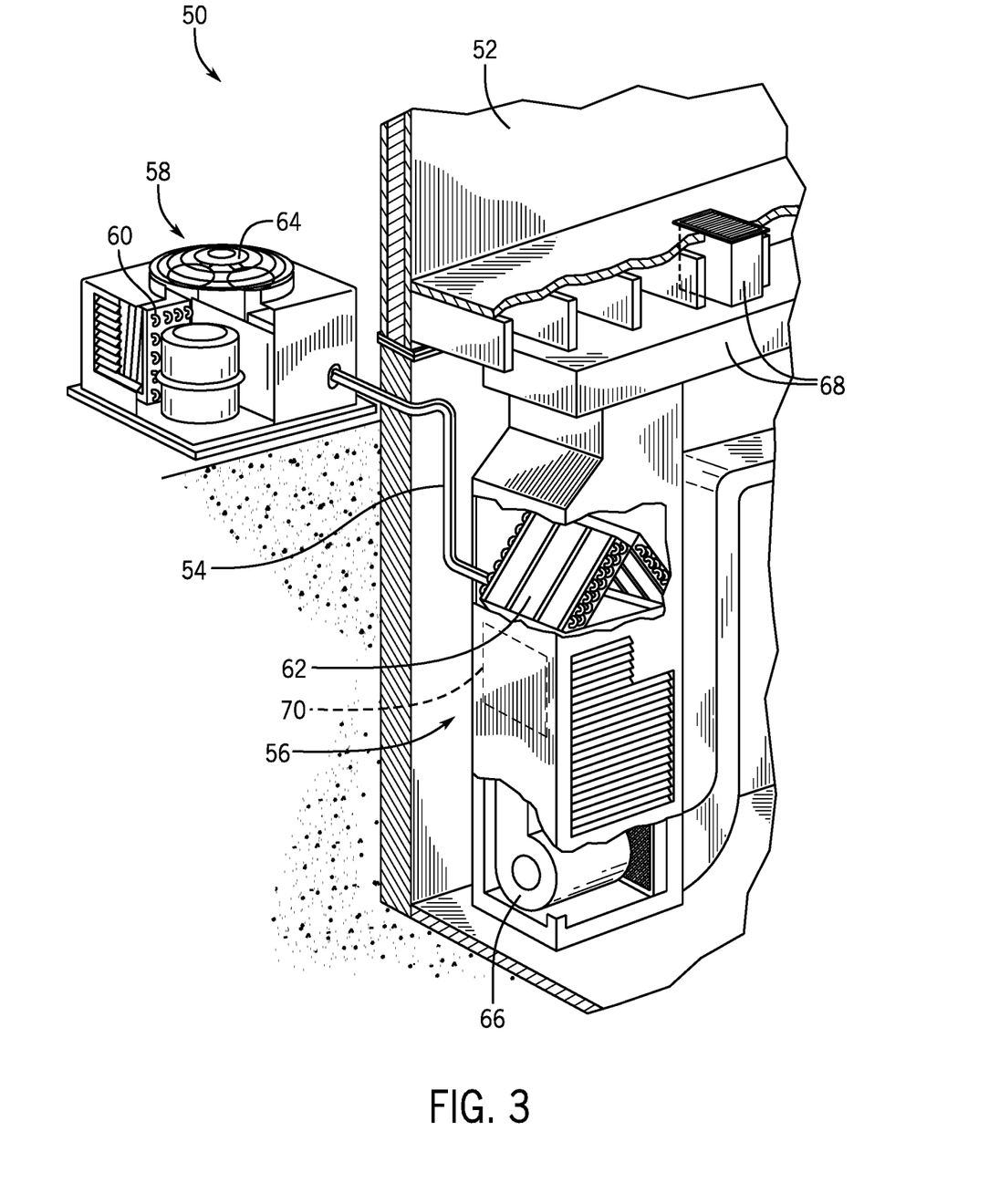
FIG. 3 is a cutaway perspective view of an embodiment of a split, residential HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or the set point plus a small amount, the residential heating and cooling system 50 may become operative to refrigerate additional air for circulation through the residence 52. When the temperature reaches the set point, or the set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over the outdoor heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
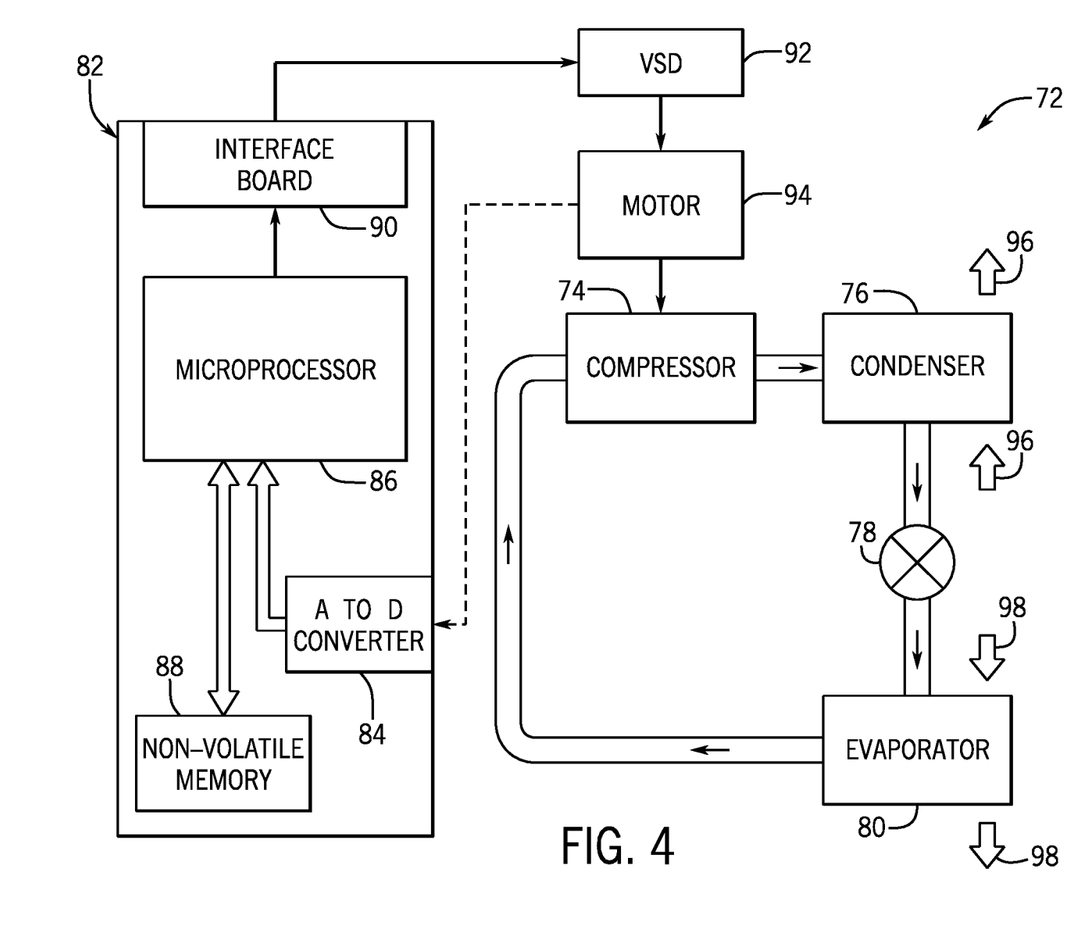
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 38 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

It should be appreciated that any of the features described herein may be incorporated with the HVAC unit 12, the residential heating and cooling system 50, or other HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

As set forth above, embodiments of the present disclosure are directed to a return air recycling system configured to increase operational efficiency of an HVAC system, such as the HVAC unit 12 and/or the residential heating and cooling system 50. For example, the return air recycling system may utilize return air that would otherwise be discharged to an ambient environment as exhaust air to cool refrigerant circulating within the HVAC system. Accordingly, the return air recycling system may include an auxiliary heat exchanger configured to place the refrigerant in thermal communication with return air, as well as an exhaust fan that forces or draws the return air across the auxiliary heat exchanger before discharging the return air as exhaust air. In some embodiments, a flow of the refrigerant through the auxiliary heat exchanger may be adjusted via a bypass valve. The bypass valve may enable the refrigerant to flow through the auxiliary heat exchanger in an open position and to bypass the auxiliary heat exchanger in a closed position. Therefore, in the closed position, the refrigerant may not flow through the auxiliary heat exchanger. Instead, the refrigerant may flow directly from a compressor of the HVAC system toward a condenser of the HVAC system, for example. Further, a speed of the exhaust fan and a position of the bypass valve may be controlled based on a temperature of the return air received from a return duct and/or another suitable operating parameter of the HVAC system. In any case, the return air recycling system is configured to increase an efficiency of the HVAC system by providing supplemental cooling of the refrigerant with return air.

Figure 5:
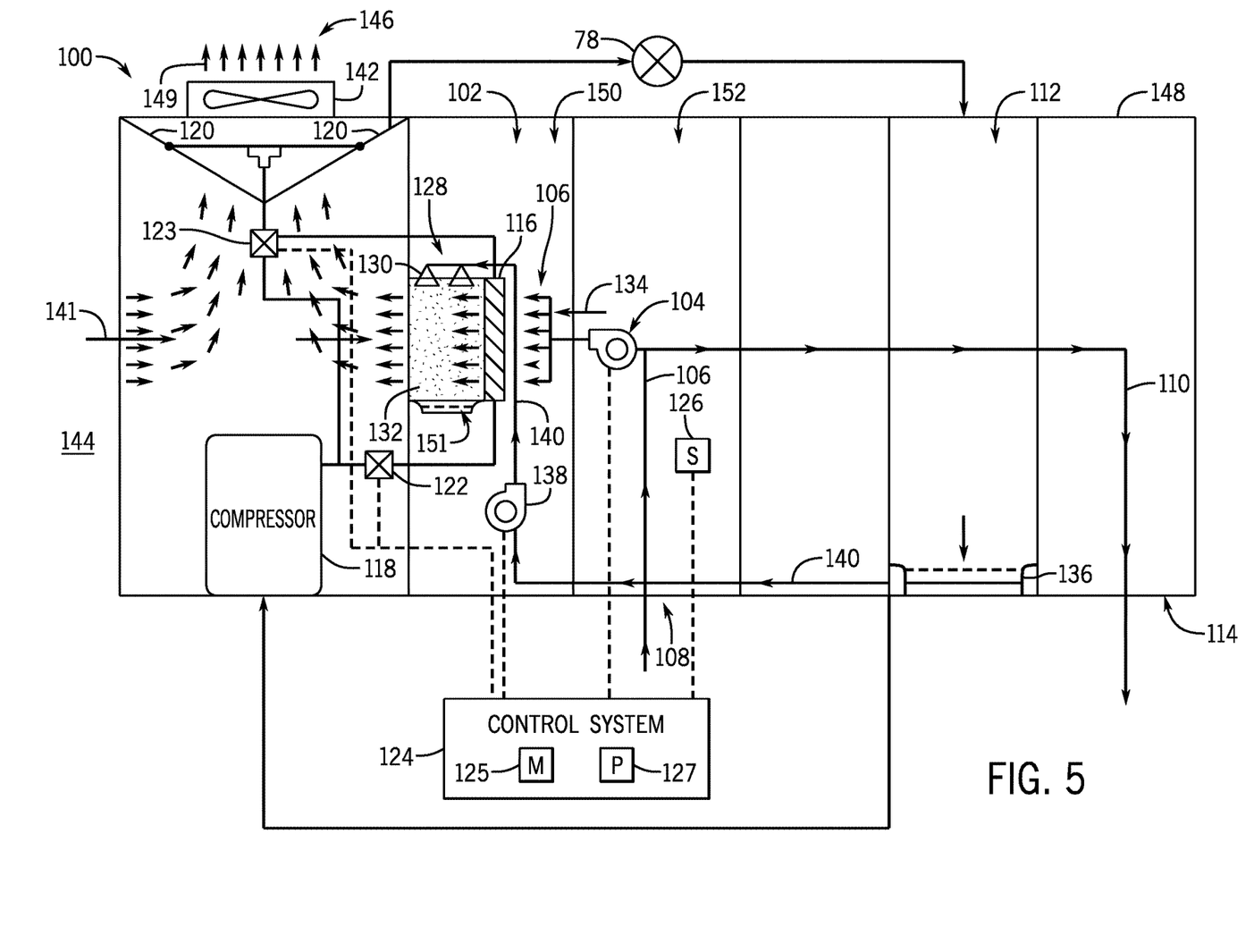
FIG. 5 is a schematic of an embodiment of a return air recycling system, which may be used in the systems of FIGS. 1-3, in accordance with an aspect of the present disclosure.

For example, FIG. 5 is a schematic of an embodiment of an HVAC system 100 having a return air recycling system 102 that is configured to increase cooling of a refrigerant of the HVAC system 100. As shown in the illustrated embodiment of FIG. 5, the return air recycling system 102 includes an exhaust fan 104 that is configured to draw return air 106 from an environment conditioned by the HVAC system 100 via a return air duct 108, for example. As should be understood, supply air 110, or conditioned air, flows from an evaporator section 112, such as a portion of the HVAC system 100 having the evaporator 80, into the environment conditioned by the HVAC system 100 via a supply duct 114. In any case, the exhaust fan 104 draws the return air 106 from the environment and directs the return air 106 across an auxiliary heat exchanger 116. The auxiliary heat exchanger 116 is disposed along a refrigerant circuit of the HVAC system 100 and thus may be fluidly coupled to the evaporator section 112 of the HVAC system 100, a compressor 118, such as the compressors 42 or the compressor 74, and a condenser 120, such as the condenser 76. Accordingly, refrigerant may circulate between the evaporator section 112, the compressor 118, the condenser 120, and/or the auxiliary heat exchanger 116 to ultimately cool the supply air 110 for conditioning the environment.

The return air recycling system 102 may include a bypass valve 122 configured to selectively enable a flow of the refrigerant through the auxiliary heat exchanger 116 and to selectively block a flow of the refrigerant through the auxiliary heat exchanger 116. For example, the bypass valve 122 may enable refrigerant to flow from the compressor 118 to the auxiliary heat exchanger 116 and thereafter from the auxiliary heat exchanger 116 to the condenser 120 when in an open position. Additionally, the bypass valve 122 may block a flow of the refrigerant from the compressor 118 to the auxiliary heat exchanger 116 in a closed position, such that refrigerant flows from the compressor 118 to the condenser 120 without flowing through the auxiliary heat exchanger 116. In some embodiments, the bypass valve 122 may be adjusted to a position between the open position and the closed position, such that a first portion of the refrigerant flows from the compressor 118 to the auxiliary heat exchanger 116 and a second portion of the refrigerant flows from the compressor 118 to the condenser 120 without flowing through the auxiliary heat exchanger 116.

Further, the return air recycling system includes a condenser valve 123 that may enable the refrigerant to flow from the compressor 118 toward the condenser 120 and/or block a flow of the refrigerant from bypassing the auxiliary heat exchanger 116. For instance, the condenser valve 123 may include a three-way valve having a first position that enables the refrigerant to bypass the auxiliary heat exchanger 116 and flow from the compressor 118 toward the condenser 120. The condenser valve 123 may also include a second position that blocks the flow of the refrigerant from bypassing the auxiliary heat exchanger 116, thereby directing the flow of the refrigerant from the compressor 118, through the auxiliary heat exchanger 116, and then to the condenser 120. Further still, the condenser valve 123 may include a third position, such as an intermediate position, that enables the first portion of the refrigerant to flow from the compressor 118 toward the condenser 120 and the second portion of the refrigerant to flow from the compressor 118 to the auxiliary heat exchanger 116 and then from the auxiliary heat exchanger 116 to the condenser 120.

In some embodiments, the bypass valve 122 and/or the condenser valve 123 are communicatively coupled to a control system 124, such as the control board 48 and/or the control panel 82. The control system 124 may include a memory 125 and a processor 127. The memory 125 may be a mass storage device, a flash memory device, removable memory, or any other non-transitory computer-readable medium that includes instructions for the processor 127 to execute. The memory 125 may also include volatile memory such as randomly accessible memory (RAM) and/or non-volatile memory such as hard disc memory, flash memory, and/or other suitable memory formats. The processor 127 may execute the instructions stored in the memory 125 in order to adjust operation of the components of the HVAC system 100, such as the bypass valve 122 and/or the condenser valve 123.

The control system 124 may be configured to adjust a position of the bypass valve 122 between the open position and the closed position based on feedback received by the control system 124. Additionally, the control system 124 may be configured to adjust a position of the condenser valve 123 based on the feedback. In some embodiments, the return air recycling system 102 includes a sensor 126 configured to provide feedback to the control system 124 indicative of a temperature of the return air 106 upstream of the auxiliary heat exchanger 116 with respect to a flow direction of the return air 106. In other embodiments, the control system 124 may receive feedback indicative of a temperature of the supply air 110, a temperature of ambient air, a temperature and/or pressure of the refrigerant, a flow rate of the return air 106, another suitable operating parameter of the HVAC system 100, or any combination thereof. In any case, the control system 124 may adjust the position of the bypass valve 122 and/or the position of the condenser valve 123 based on feedback indicative of an operating parameter of the HVAC system 100 to enable and/or block a flow of refrigerant to and/or from the auxiliary heat exchanger 116.

Further, the exhaust fan 104 may also be communicatively coupled to the control system 124, such that the control system 124 is configured to adjust a speed of the exhaust fan 104 based on the feedback received from the sensor 126 and/or another suitable source. In some embodiments, the control system 124 may increase a speed of the exhaust fan 104, adjust the bypass valve 122 to the open position, and/or adjust the condenser valve to the closed position when feedback indicative of the temperature of the return air 106 falls below a first threshold value. Additionally, the control system 124 may reduce a speed of the exhaust fan 104, adjust the bypass valve 122 toward the closed position, and/or adjust the condenser valve 123 to the open position when the feedback indicative of the temperature of the return air 106 exceeds a second threshold, greater than the first threshold. Accordingly, the control system 124 may enable thermal communication between the return air 106 and the refrigerant flowing through the auxiliary heat exchanger 116 when a temperature of the return air 106 is suitable for cooling, or de-superheating, the refrigerant. In this manner, the return air 106 may absorb thermal energy from the refrigerant flowing through the auxiliary heat exchanger 116 and reduce a temperature of the refrigerant before the refrigerant is directed toward the condenser 120.

As shown in the illustrated embodiment of FIG. 5, after the return air 106 flows across the auxiliary heat exchanger 116, the return air 106 may be re-cooled via an adiabatic cooling system 128 of the return air recycling system 102. For instance, the adiabatic cooling system 128 includes a nozzle 130 configured to direct or spray condensate 132 into the return air 106 downstream of the auxiliary heat exchanger 116 with respect to a direction 134 of flow of the return air 106. The nozzle 130 may receive the condensate 132 from a condensate collector 136 that is positioned within the evaporator section 112. For instance, condensate 132 may be formed as the supply air 110 transfers thermal energy to the refrigerant flowing through the evaporator section 112, thereby condensing fluid particles that are present within the supply air 110. The condensate 132 may be directed from the condensate collector 136 toward the nozzle 130 via a pump 138 disposed along a condensate conduit 140 extending from the condensate collector 136 to the nozzle 130. The pump 138 is configured to direct the condensate 132 from the condensate collector 136, along the condensate conduit 140, and to the nozzle 130. In some embodiments, the pump 138 may be communicatively coupled to the control system 124, such that the control system 124 is configured to adjust a speed of the pump 138. The control system 124 may adjust the speed of the pump 138 based on feedback indicative of a liquid level of condensate 132 within the condensate collector 136, a temperature of the return air 106, an operational state of the exhaust fan 104, a position of the bypass valve 122, another suitable operating parameter of the HVAC system 100, or any combination thereof.

In any case, the condensate 132 dispersed into the return air 106 via the nozzle 130 may enable thermal communication between the return air 106 and the condensate 132. For example, the condensate 132 may absorb thermal energy from the return air 106 via adiabatic cooling, thereby reducing a temperature of the return air 106. Thus, while a temperature of the return air 106 increases after flowing across the auxiliary heat exchanger 116 and absorbing thermal energy from the refrigerant within the auxiliary heat exchanger 116, the temperature of the return air 106 may be reduced via the adiabatic cooling system 128 of the return air recycling system 102. The cooled return air 106 may then flow from the adiabatic cooling system 128 toward the condenser 120 to be placed in thermal communication with the refrigerant in the condenser 120. In some embodiments, the return air 106 exiting the adiabatic cooling system 128 may mix with ambient air 141 upstream of the condenser 120 with respect to the direction 134 of flow of the return air 106. The ambient air 141 may have a temperature that is less than the return air 106, which may enable the mixture of ambient air 141 and return air 106 to sufficiently cool and/or condense the refrigerant within the condenser 120.

As shown in the illustrated embodiment of FIG. 5, the HVAC system 100 includes a condenser fan 142 that draws the ambient air 141 from an ambient environment 144 into a condenser section 146 of the HVAC system 100 and across the condenser 120. For example, the HVAC system 100 may include a housing 148 having a plurality of sections. As used herein, a "section" of the housing 148 may include a compartment or other portion of the housing 148 that encloses or otherwise includes various components of the HVAC system 100 and receives or directs a flow of air, such as return air, supply air, and/or ambient air. For example, as set forth above, the evaporation section 118 may include the evaporator 80 that receives refrigerant from the expansion valve 78 to place the refrigerant in thermal communication with the supply air 110 to condition the supply air 110 before it is directed into the environment conditioned by the HVAC system 100. Additionally, the condenser section 146 may be exposed to the ambient air 141 and include the condenser 120, and in some embodiments, the compressor 118. As such, the condenser fan 142 may also draw the return air 106 from the adiabatic cooling system 128 and toward the condenser 120. The mixture of the return air 106 and the ambient air 141 flowing across the condenser 120 may then be discharged from the condenser section 146 of the HVAC system 100 to the ambient environment 144 as exhaust air 149.

As shown in the illustrated embodiment of FIG. 5, the return air recycling system 102 is disposed within a return air recycling section 150 of the housing 148 of the HVAC system 100. In some embodiments, the return air recycling section 150 may be a portion of an enclosed portion of the housing 148 that includes an opening 151 for discharging the return air 106 from the enclosed portion of the housing 148 to the condenser section 146 that is exposed to ambient air 141. The return air recycling section 150 may be positioned adjacent to, or proximate to, a return air section 152, such that the auxiliary heat exchanger 116 may receive the return air 106 and transfer thermal energy from the refrigerant to the return air 106. Additionally, the adiabatic cooling system 128 may be disposed within the return air recycling section 150, such that the return air 106 cooled by the adiabatic cooling system 128 is discharged from the opening 151 and into the condenser section 146, which is exposed to the ambient air 141. While the illustrated embodiment of FIG. 5 shows the adiabatic cooling system 128 within the return air recycling section 150, in other embodiments, the adiabatic cooling system 128 may be disposed within the condenser section 146.

Figure 6:
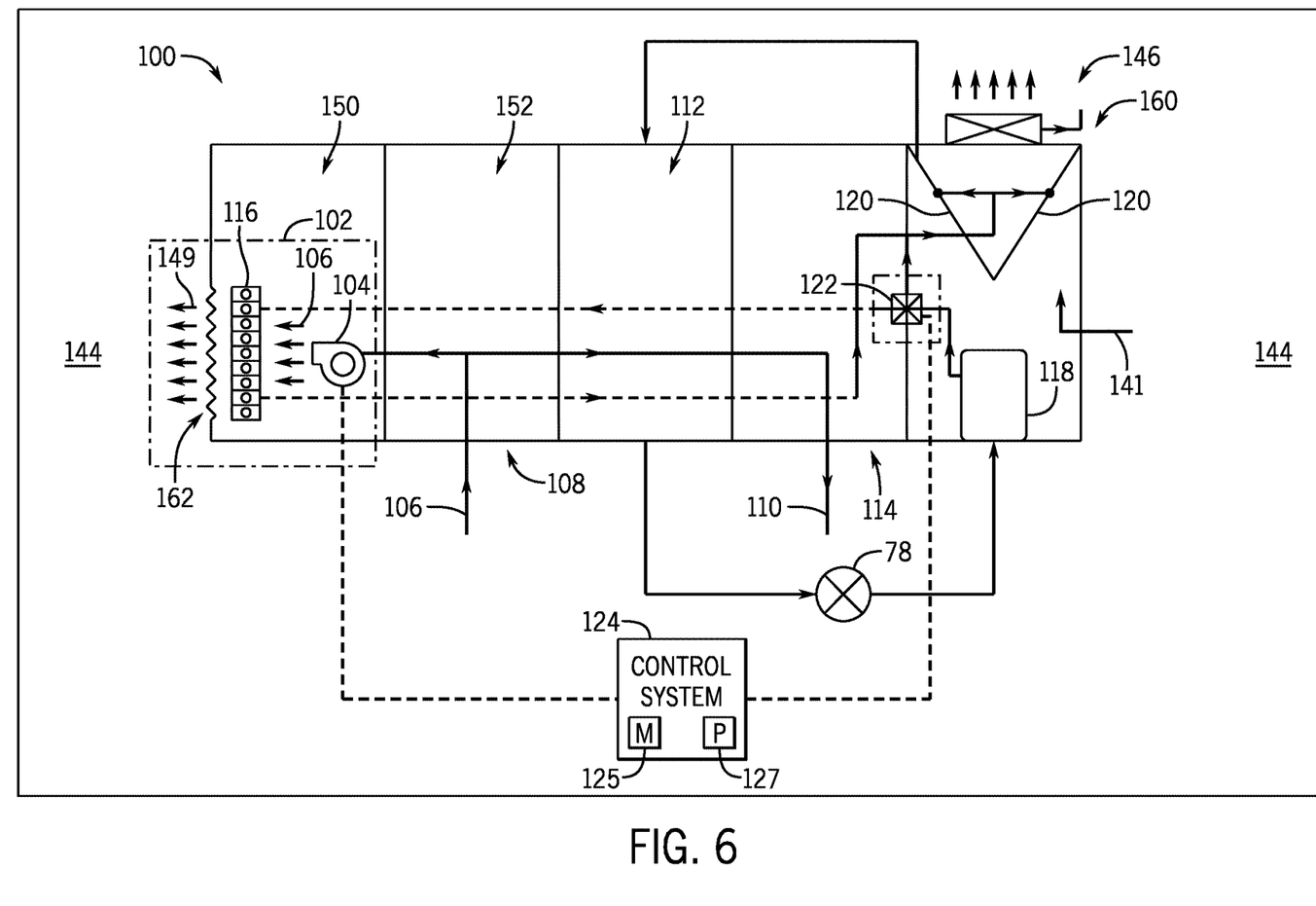
FIG. 6 is a schematic of an embodiment of the return air recycling system, in accordance with an aspect of the present disclosure.

In some embodiments, the return air 106 may not be mixed with the ambient air 141 and may not directed across the condenser 120. For example, FIG. 6 is a schematic of an embodiment of the HVAC system 100 having the return air recycling system 102, where the return air 106 is not directed across the condenser 120. As shown in the illustrated embodiment of FIG. 6, the condenser section 146 of the HVAC system 100 is positioned adjacent to the supply duct 114 and on an opposite side 160 of the evaporator section 112 from the embodiment illustrated in FIG. 5. Accordingly, the return air 106 is directed across the auxiliary heat exchanger 116 but not the condenser 120. For example, return air recycling section 152 may still be positioned adjacent to the return air section 152, such that the exhaust fan 104 may draw the return air 106 from the return air duct 108 and direct the return air 106 across the auxiliary heat exchanger 116. In some embodiments, the return air recycling section 152 includes an exhaust 162 that directs the return air 106 toward the ambient environment 144 as the exhaust air 149. Therefore, a location of the return air recycling system 102 within the HVAC system 100 is substantially similar to that shown in the embodiment of FIG. 5, but the location of the condensing section 146 is different. In other embodiments, the exhaust fan 104 may be positioned within the return air section 152 instead of the return air recycling section 150. In any case, the return air 106 is not directed toward the condenser 120 in the embodiment of FIG. 6.

As shown in the illustrated embodiment of FIG. 6, the HVAC system 100 does not include the adiabatic cooling system 128 because the return air 106 discharged from the auxiliary heat exchanger 116 is not utilized to cool the refrigerant within the condenser 120. Nevertheless, operation of the HVAC system 100 may be substantially the same. For instance, the compressor 118 may direct refrigerant toward the bypass valve 122, which may enable a flow of refrigerant toward the auxiliary heat exchanger 116 and/or block a flow of the refrigerant toward the auxiliary heat exchanger 116. As set forth above, the control system 124 may adjust a position of the bypass valve 122 based on feedback indicative of a temperature of the return air 106, among other operating conditions of the HVAC system 100. Additionally, the control system 124 may be configured to adjust a speed of the exhaust fan 104 based on feedback received by the control system 124.

Figure 7:
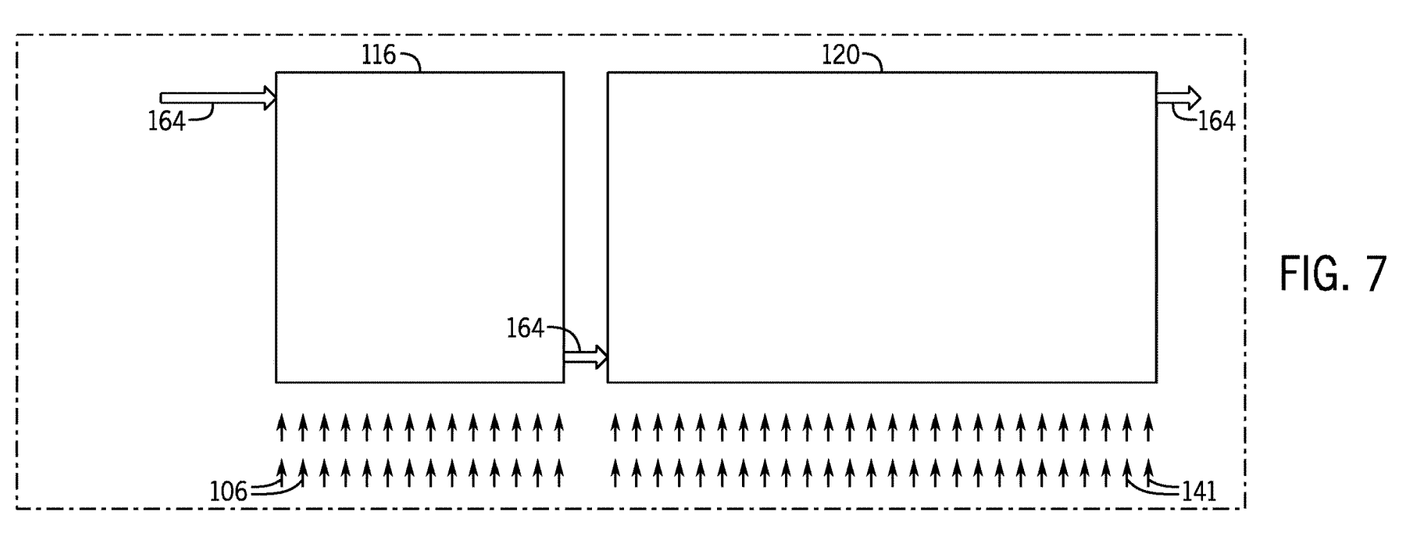
FIG. 7 is a simplified schematic of an embodiment of the return air recycling system of FIG. 6, in accordance with an aspect of the present disclosure.

FIG. 7 is a simplified schematic illustrating the flow of refrigerant 164 between the auxiliary heat exchanger 116 and the condenser 120 of the HVAC system 100 of FIG. 6. As shown in the illustrated embodiment of FIG. 7, the return air 106 is directed across the auxiliary heat exchanger 116 to remove thermal energy from the refrigerant 164 flowing through the auxiliary heat exchanger 116. The refrigerant 164 flows from the auxiliary heat exchanger 116 to the condenser 120, where the ambient air 141 is in thermal communication with the refrigerant 164 in the condenser 120. In some embodiments, the ambient air 141 may have a temperature that is less than a temperature of the return air 106. In such circumstances, the refrigerant 164 flowing within the auxiliary heat exchanger 116 may be de-superheated or pre-cooled by the return air 106. Thereafter, the refrigerant 164 flowing through the condenser 120 after flowing through the auxiliary heat exchanger 116 may incur a further reduction in temperature by transferring thermal energy to the ambient air 141, such that the refrigerant 164 is condensed and/or subcooled. In any case, the return air 106 may be utilized as a supplemental source of cooling to pre-cool the refrigerant 164 prior to the refrigerant 164 flowing into the condenser 120.

Figure 8:
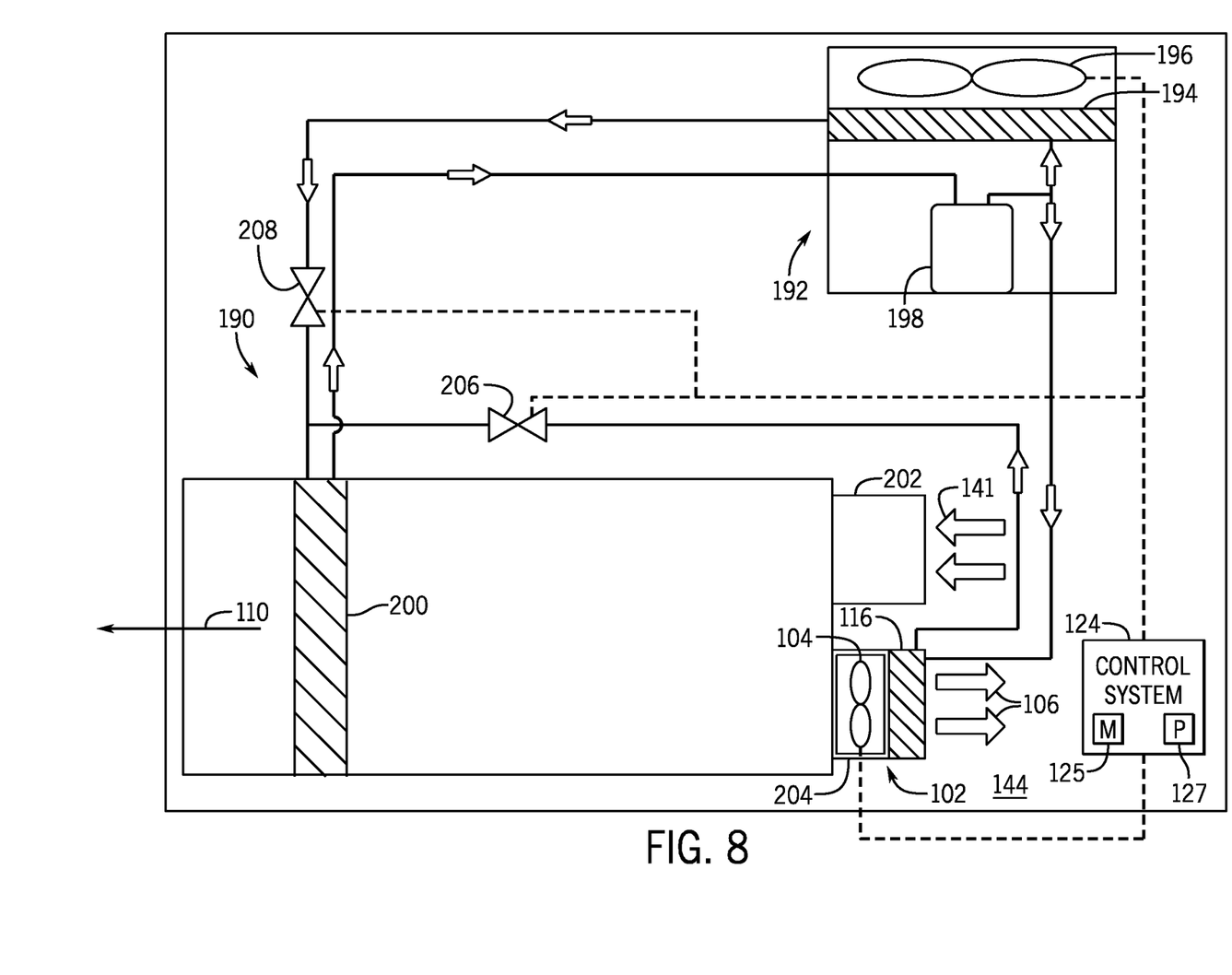
FIG. 8 is a schematic of an embodiment of the return air recycling system for a dedicated outdoor air system (DOAS), in accordance with an aspect of the present disclosure.

FIG. 8 is a schematic of an embodiment of a dedicated outdoor air system (DOAS) 190 having the return air recycling system 102. As shown in the illustrated embodiment of FIG. 8, the DOAS 190 is in fluid communication with a variable refrigeration system (VRF) 192, which includes a condenser 194, such as the condenser 120, a condenser fan 196, such as the condenser fan 142, and a compressor 198, such as the compressor 118. The compressor 198 is configured to circulate the refrigerant between the components of the VRF 192 and the DOAS 190. For example, the DOAS 190 may include an evaporator 200, such as the evaporator section 112 and/or the evaporator 80, which may be in thermal communication with the ambient air 141. As shown in the illustrated embodiment of FIG. 8, the DOAS 190 includes an air intake 202 and an exhaust port 204 or section for discharging return air received from the environment conditioned by the DOAS 190 to the ambient environment. For instance, the DOAS 190 may intake the ambient air 141 via the air intake 202, which then is placed in thermal communication with the evaporator 200 to provide the supply air 110 to the environment conditioned by the DOAS 190. Return air 106 from the conditioned environment is discharged from the DOAS and into the ambient environment 144 via the exhaust port 204.

As shown in the illustrated embodiment of FIG. 8, the exhaust port 204 includes the auxiliary heat exchanger 116 and the exhaust fan 104. Accordingly, the return air 106 is drawn from within the environment conditioned by the DOAS 190 and directed across the auxiliary heat exchanger 116 to place the return air 106 in thermal communication with refrigerant flowing through the auxiliary heat exchanger 116. In some embodiments, the return air recycling system 102 of the DOAS 190 includes a first valve 206 and a second valve 208 to control a flow of refrigerant through the auxiliary heat exchanger 116 and the condenser 194. For example, the first valve 206 may enable a flow of the refrigerant from the compressor 198 to the auxiliary heat exchanger 116 and/or block the flow of refrigerant from the compressor 198 to the auxiliary heat exchanger 116. Further, the second valve 208 may enable a flow of the refrigerant from the compressor 198 to the condenser 194 and/or block the flow of refrigerant from the compressor 198 to the condenser 194. As such, the return air recycling system 102 of the DOAS 190 may utilize the return air 106 and the auxiliary heat exchanger 116 to cool the refrigerant without using the condenser 120. Operation of the DOAS 190, the VRF 192, and the return air recycling system 102 via the first valve 206 and second valve 208 is described in further detail below.

For instance, the control system 124 is communicatively coupled to both the first valve 206 and the second valve 208 and may adjust a position of both the first valve 206 and the second valve 208 based on feedback received by the control system 124. As set forth above, the control system 124 may adjust the positions of the first valve 206 and the second valve 208 based on feedback indicative of the temperature of the return air 106, a temperature of the ambient air 141, a temperature and/or pressure of the refrigerant, a flow rate of the ambient air 141, a flow rate of the return air 106, another suitable operating parameter of the DOAS 190 and/or the VRF 192, or any combination thereof.

As a non-limiting example, the control system 124 may adjust the positions of the first valve 206 and the second valve 208 based on the feedback indicative of the temperature of the return air 106. The control system 124 may adjust the first valve 206 to a closed position and adjust the second valve 208 to an open position when the feedback indicative of the temperature of the return air 106 exceeds a first threshold. When the temperature of the return air 106 is higher, the cooling capacity of the return air 106 may be limited. Thus, refrigerant flow from the compressor 198 and through the auxiliary heat exchanger 116 is blocked because the first valve 206 is closed. Instead, with the second valve 208 open, refrigerant may flow from the compressor 198, through the condenser 194, through the evaporator 200 of the DOAS 190, and then back to the compressor 198.

Alternatively, the control system 124 may adjust the position of the first valve 206 to a partially open position and/or adjust the position of the second valve 208 to a partially open position when the feedback indicative of the temperature of the return air 106 falls below a second threshold, less than the first threshold. In this configuration, a first portion of refrigerant flows from the compressor 198, through the condenser 194, through the second valve 208 to the evaporator 200, and then back to the compressor 198. Additionally, a second portion of the refrigerant flows from the compressor 198, through the auxiliary heat exchanger 116, where the second portion of refrigerant is cooled via the return air 106, then through the first valve 206 to the evaporator 200, and then back to the compressor 198.

Further still, the control system 124 may adjust the position of the first valve 206 to an open position and adjust the second valve 208 to a closed position when the feedback indicative of the temperature of the return air 106 falls below a third threshold, less than the first threshold and the second threshold. In other words, when the temperature of the return air 106 falls below the third threshold, which may be a temperature at which the return air 106 is suitable for condensing the refrigerant, the DOAS 190 may utilize the auxiliary heat exchanger 116 to cool and condense the refrigerant without utilizing the condenser 194, and thus the condenser fan 196. In other words, when the temperature of the return air 106 falls below the third threshold, the auxiliary heat exchanger 116 may function as a condenser by utilizing the cooling capacity of the return air 106 to condense the refrigerant instead of utilizing the condenser 194 and condenser fan 196. Thus, the control system 124 may adjust the speed of the condenser fan 196 based on a cooling capacity provided by the return air recycling system 102. Therefore, the energy consumption of the VRF 192 may be reduced and efficiency of the system may be improved.

Figure 9:
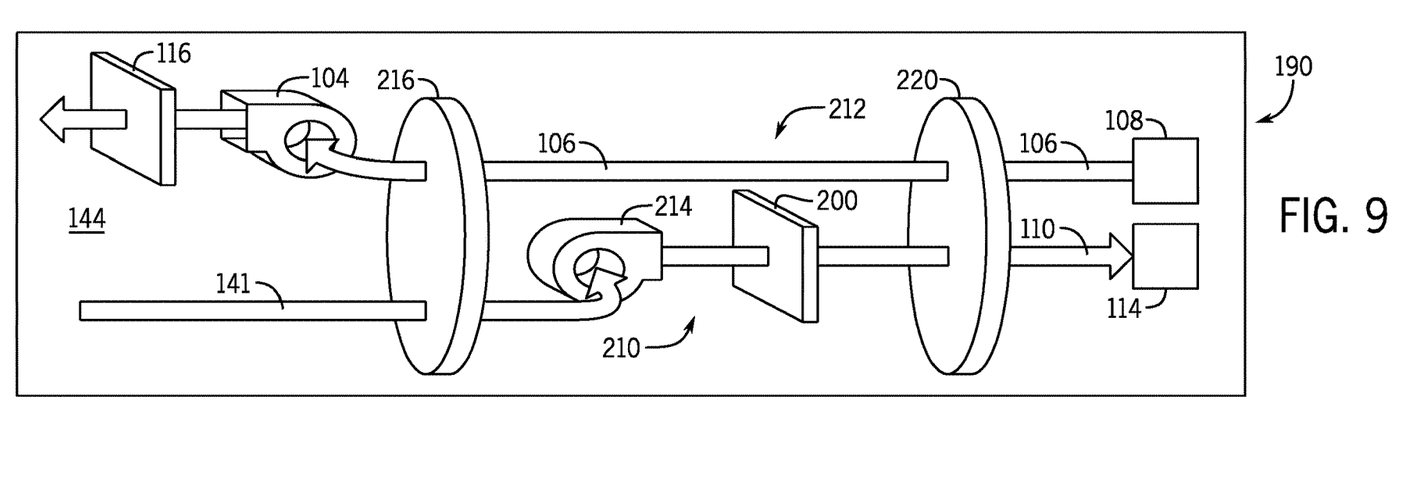
FIG. 9 is a schematic of a flow path of return air and a flow path of supply air through the DOAS of FIG. 8, in accordance with an aspect of the present disclosure.

FIG. 9 is a schematic of an embodiment of the DOAS 190, illustrating a flow path 210 of the supply air 110 and a flow path 212 of the return air 106. For example, the ambient air 141 may be drawn into the DOAS 190 via a supply fan 214. In some embodiments, the ambient air 141 may pass through an enthalpy wheel 216, which is configured to place the ambient air 141 in thermal communication with the return air 106. For example, the enthalpy wheel 216 may transfer thermal energy from the return air 106 to the ambient air 141, such that the return air 106 is cooled prior to flowing across the auxiliary heat exchanger 116. In any case, the supply fan 214 directs the ambient air 141 across the evaporator 200, such as the evaporator section 112 having the evaporator 80, to cool and/or otherwise condition the ambient air 141. The ambient air 141 is then directed across a desiccant wheel 220, which is configured to remove moisture from the ambient air 141 and generate the supply air 110 that is ultimately directed to the environment conditioned by the DOAS 190. In some embodiments, the desiccant wheel 220 includes an adsorbent material that is configured to remove moisture and/or fluids from the ambient air 141, such that the supply air 110 directed to the environment does not substantially affect a humidity of the environment.

As shown in the illustrated embodiment of FIG. 9, the return air 106 is received by the DOAS 190 from the environment conditioned by the DOAS 190 via the exhaust duct 108. The return air 106 may also be drawn through the desiccant wheel 220 via the exhaust fan 104. In some embodiments, moisture within the return air 106 may be removed prior to the return air 106 flowing across the auxiliary heat exchanger 116 and exchanging thermal energy with the refrigerant in the auxiliary heat exchanger 116. Further still, the return air 106 is directed through the enthalpy wheel 216 to be placed in thermal communication with the ambient air 141. As set forth above, in some embodiments, thermal energy from the return air 106 may be transferred to the ambient air 141 via the enthalpy wheel 216 to reduce a temperature of the return air 106 prior to the return air 106 flowing across the auxiliary heat exchanger 116. In any case, the return air 106 may be directed across the auxiliary heat exchanger 116 to absorb thermal energy from the refrigerant flowing therethrough and may then be discharged to the ambient environment 144 as exhaust air. As similarly discussed above, the auxiliary heat exchanger 116 may be utilized alone, or in combination with the condenser 194, to cool the refrigerant. Utilizing a cooling capacity of the return air 106 may thus increase an efficiency of the DOAS 190.

As set forth above, embodiments of the present disclosure may provide one or more technical effects useful in increasing an efficiency of an HVAC system. For example, embodiments of the present disclosure are directed to a return air recycling system configured to utilize a cooling capacity of return air drawn from a conditioned environment in order to improve an efficiency of the HVAC system. For example, the return air recycling system includes an exhaust fan configured to direct return air across an auxiliary heat exchanger. The auxiliary heat exchanger may receive a flow of refrigerant from a refrigerant circuit of the HVAC system and may enable thermal energy to transfer from the refrigerant to the return air to provide cooling to the refrigerant. In some embodiments, the return air recycling system includes an adiabatic cooling system positioned downstream of the auxiliary heat exchanger with respect to a direction of flow of the return air. The adiabatic cooling system may direct condensate or another cooling fluid into the return air to reduce a temperature of the return air via adiabatic cooling. Thereafter, the return air may be utilized to absorb thermal energy from refrigerant within a condenser, or primary heat exchanger, of the HVAC system. Further still, the return air recycling system may be included in a dedicated outdoor air system (DOAS) and utilized to cool refrigerant, alone or in combination with a condenser of a variable refrigeration system (VRF). In any case, the return air recycling system utilizes return air to cool a refrigerant of an HVAC system to improve an efficiency of the HVAC system. The technical effects and technical problems in the specification are examples and are not limiting. It should be noted that the embodiments described in the specification may have other technical effects and can solve other technical problems.

While only certain features and embodiments have been illustrated and described, many modifications and changes may occur to those skilled in the art, such as variations in sizes, dimensions, structures, shapes and proportions of the various elements, values of parameters, such as temperatures and pressures, mounting arrangements, use of materials, colors, orientations, and so forth, without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode, or those unrelated to enablement. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A heating, ventilation, and/or air conditioning (HVAC) system having a return air recycling system, comprising:
a heat exchanger configured to be disposed along a refrigerant circuit of the HVAC system and flow a refrigerant therethrough;
a compressor configured to be disposed along the refrigerant circuit to circulate the refrigerant through the refrigerant circuit;
a condenser of the refrigerant circuit, wherein the condenser is configured to place the refrigerant in thermal communication with a mixture of ambient air and return air;

a first valve configured to regulate flow of the refrigerant between the compressor and the condenser;

a second valve configured to regulate flow of the refrigerant between the compressor and the heat exchanger;

an exhaust fan configured to direct return air across the heat exchanger to place the refrigerant in thermal communication with the return air and to exhaust the return air from the HVAC system; and a controller communicatively coupled to the exhaust fan, the first valve, and the second valve, wherein the controller is configured to:

receive feedback indicative of a temperature of the return air;

adjust a speed of the exhaust fan, a flow rate of refrigerant through the heat exchanger, or both, based on the feedback indicative of the temperature of the return air; and adjust a first position of the first valve and adjust a second position of the second valve based on the feedback indicative of the temperature of the return air.

2. The HVAC system of claim 1, comprising a condensate recycling system configured to direct condensate from a condensate collector into the return air downstream of the heat exchanger and upstream of the condenser of the refrigerant circuit with respect to a flow direction of the return air.

3. The HVAC system of claim 2, further comprising a nozzle of the condensate recycling system and a pump of the condensate recycling system, wherein the pump is configured to direct the condensate from the condensate collector to the nozzle.

4. The HVAC system of claim 3, wherein the controller is communicatively coupled to the pump and is configured to adjust an additional speed of the pump based on feedback indicative of a fluid level within the condensate collector.

5. The HVAC system of claim 1, wherein the second valve comprises a bypass valve configured to enable the refrigerant to bypass the heat exchanger and flow toward the condenser of the refrigerant circuit.

6. The HVAC system of claim 5, wherein the controller is communicatively coupled to the bypass valve, and wherein the controller is configured to adjust the flow rate of refrigerant through the heat exchanger and adjust the speed of the exhaust fan based on the feedback indicative of the temperature of the return air.

7. The HVAC system of claim 1, wherein the controller is configured to adjust the first valve to a closed position and adjust the second valve to an open position when the feedback indicative of the temperature of the return air falls below a threshold.

8. The HVAC system of claim 7, wherein the controller is configured to adjust the first valve to a first partially open position and adjust the second valve to a second partially open position when the feedback indicative of the temperature of the return air exceeds an additional threshold, greater than the threshold.

9. The HVAC system of claim 1, wherein the feedback indicative of the temperature of the return air is indicative of the temperature of the return air upstream of the heat exchanger.

10. The HVAC system of claim 1, wherein the controller is configured to:

increase the speed of the exhaust fan, increase the flow rate of refrigerant through the heat exchanger, or both in response to the feedback indicative of the temperature of the return air falling below a first threshold; and decrease the speed of the exhaust fan, decrease the flow rate of refrigerant through the heat exchanger, or both in response to the feedback indicative of the temperature of the return air rising above a second threshold.

11. A heating, ventilation, and/or air conditioning (HVAC) system, comprising:

a condenser disposed along a refrigerant circuit and configured to receive a refrigerant to place the refrigerant in thermal communication with ambient air, wherein the condenser is configured to place the refrigerant in thermal communication with a mixture of ambient air and return air;

a heat exchanger disposed along the refrigerant circuit and configured to receive the refrigerant upstream of the condenser with respect to a flow direction of the refrigerant through the refrigerant circuit;

a compressor disposed along the refrigerant circuit to circulate the refrigerant through the refrigerant circuit;

a first valve configured to regulate flow of the refrigerant between the compressor and the condenser;

a second valve configured to regulate flow of the refrigerant between the compressor and the heat exchanger;

an exhaust fan configured to direct return air across the heat exchanger to place the refrigerant in thermal communication with the return air; and a controller communicatively coupled to the exhaust fan, the first valve, and the second valve, wherein the controller is configured to:

receive feedback indicative of a temperature of the return air;

adjust a speed of the exhaust fan, a flow rate of refrigerant through the heat exchanger, or both, based on the feedback indicative of the temperature of the return air; and adjust a first position of the first valve and adjust a second position of the second valve based on the feedback indicative of the temperature of the return air.

12. The HVAC system of claim 11, wherein the HVAC system comprises a condenser fan communicatively coupled to the controller and configured to draw the ambient air across the condenser, and wherein the controller is configured to adjust an additional speed of the condenser fan based on the feedback indicative of the temperature of the return air.

13. The HVAC system of claim 12, wherein the controller is configured to reduce the additional speed of the condenser fan when the feedback indicative of the temperature of the return air falls below a threshold.

14. The HVAC system of claim 11, wherein the second valve is configured to enable the flow of the refrigerant between the compressor and the heat exchanger in an open position and configured to block the flow of the refrigerant between the compressor and the heat exchanger in a closed position.

15. The HVAC system of claim 14, wherein the controller is configured to adjust the second valve to the closed position when the feedback indicative of the temperature of the return air exceeds a threshold.

16. The HVAC system of claim 14, wherein the controller is configured to adjust the second valve to the open position when the feedback indicative of the temperature of the return air falls below a threshold.

17. The HVAC system of claim 11, wherein the controller is configured to:
increase the speed of the exhaust fan in response to the feedback indicative of the temperature of the return air falling below a first threshold; and
decrease the speed of the exhaust fan in response to the feedback indicative of the temperature of the return air rising above a second threshold.

18. A return air recycling system for a heating, ventilation, and air conditioning (HVAC) system, comprising:
a heat exchanger configured to receive refrigerant from a refrigerant circuit of the HVAC system;
a compressor disposed along the refrigerant circuit to circulate the refrigerant through the refrigerant circuit;
a condenser disposed along the refrigerant circuit, wherein the condenser is configured to place the refrigerant in thermal communication with a mixture of ambient air and return air;
an exhaust fan configured to direct return air across the heat exchanger to place the refrigerant in thermal communication with the return air;
a first valve configured to regulate flow of the refrigerant between the compressor and the condenser;
a second valve configured to regulate flow of the refrigerant between the compressor and the heat exchanger, the second valve having an open position and a closed position, wherein the second valve is configured to enable the flow of the refrigerant between the compressor and the heat exchanger in the open position and to block the flow of the refrigerant between the compressor and the heat exchanger in the closed position; and
a controller communicatively coupled to the exhaust fan, the first valve, and the second valve, wherein the controller is configured to:
receive feedback indicative of a temperature of the return air; and
adjust a speed of the exhaust fan, positioning of the first valve and positioning of the second valve, based on the feedback indicative of the temperature of the return air.

19. The return air recycling system of claim 18, wherein the controller is configured to adjust the positioning of the second valve to the closed position when the feedback indicative of the temperature of the return air exceeds a threshold.

20. The return air recycling system of claim 19, wherein the controller is configured to adjust the positioning of the second valve to the open position when the feedback indicative of the temperature of the return air falls below an additional threshold that is less than the threshold.

21. The return air recycling system of claim 18, comprising an enthalpy wheel configured to place the return air in thermal communication with ambient air prior to the return air flowing across the heat exchanger.

* * * * *